United States Patent
Peng et al.

(10) Patent No.: US 12,457,572 B2
(45) Date of Patent: Oct. 28, 2025

(54) TIMING ADJUSTMENT METHOD AND RELATED DEVICE

(71) Applicant: VIVO MOBILE COMMUNICATION CO., LTD., Guangdong (CN)

(72) Inventors: Shuyan Peng, Guangdong (CN); Jinhua Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 414 days.

(21) Appl. No.: 17/976,472

(22) Filed: Oct. 28, 2022

(65) Prior Publication Data

US 2023/0046730 A1    Feb. 16, 2023

Related U.S. Application Data

(63) Continuation of application No. PCT/CN2021/089578, filed on Apr. 25, 2021.

(30) Foreign Application Priority Data

Apr. 30, 2020    (CN) .......................... 202010368285.X

(51) Int. Cl.
| | | |
|---|---|---|
| H04W 56/00 | (2009.01) | |
| H04W 72/0446 | (2023.01) | |
| H04W 72/23 | (2023.01) | |

(52) U.S. Cl.
CPC ... *H04W 56/0045* (2013.01); *H04W 72/0446* (2013.01); *H04W 72/23* (2023.01)

(58) Field of Classification Search
CPC ......... H04W 56/0045; H04W 56/0015; H04W 56/004; H04W 56/001; H04W 72/0446; H04W 72/23; H04W 72/231; H04W 72/232; H04W 84/047; H04W 40/22; H04L 27/2665; H04L 5/0053
See application file for complete search history.

(56) References Cited

U.S. PATENT DOCUMENTS

| | | | |
|---|---|---|---|
| 2020/0059879 | A1 | 2/2020 | Nam et al. |
| 2020/0084819 | A1 | 3/2020 | Abedini et al. |
| 2020/0128539 | A1 | 4/2020 | Abedini et al. |

(Continued)

FOREIGN PATENT DOCUMENTS

| | | | |
|---|---|---|---|
| CN | 110536466 A | 12/2019 | |
| CN | 110972211 A | 4/2020 | |

(Continued)

OTHER PUBLICATIONS

Extended European Search Report for Application No. 21796883.3 dated Sep. 27, 2023, 8 Pages.

(Continued)

*Primary Examiner* — Jianye Wu
(74) *Attorney, Agent, or Firm* — BROOKS KUSHMAN P.C.

(57) ABSTRACT

A timing adjustment method and a related device. The method includes: adjusting timing of a first link state based on first signaling, where the first link state is a link state of a first relay device or a terminal; and the first signaling is provided by a parent node of the first relay device, or a parent node of the terminal, or a first network-side device, where the parent node is a last-hop device of the first relay device or the terminal.

18 Claims, 8 Drawing Sheets

(56) References Cited

U.S. PATENT DOCUMENTS

| | | |
|---|---|---|
| 2021/0153189 A1 | 5/2021 | Jo et al. |
| 2021/0160861 A1 | 5/2021 | You et al. |
| 2021/0218620 A1 | 7/2021 | Yuan et al. |
| 2021/0219183 A1 | 7/2021 | Huang et al. |

FOREIGN PATENT DOCUMENTS

| | | | | |
|---|---|---|---|---|
| CN | 111052837 A | | 4/2020 | |
| CN | 110972211 B | * | 10/2023 | ......... H04L 41/0803 |
| RU | 2786411 C2 | * | 12/2022 | ........... H04B 7/0626 |
| WO | 2019194661 A | | 10/2019 | |
| WO | 2019242748 A1 | | 12/2019 | |
| WO | 2020081803 A1 | | 4/2020 | |

OTHER PUBLICATIONS

First Office Action for Japanese Application No. 2022-566280, dated Jul. 19, 2023, 3 Pages.

Ericsson "IAB resource configuration and multiplexing" 3GPP TSG-RAN WG1 Meeting #97, Reno, U.S.A., May 2019, R1-1906588, 9 Pages.

Ericsson "IAB resource configuration and multiplexing" 3GPP TSG-RAN WG1 Meeting #98, Prague, CZ, Aug. 2019, R1-1909026, 11 Pages.

Nokia, Nokia Shanghai Bell "Open items with IAB Case #1 timing" 3GPP TSG RAN WG1 #98bis, Chongqing, China, Oct. 2019, R1-1911195, 5 Pages.

Foreign Office Action First Office Action for Chinese Application No. 202010368285.X, dated Apr. 6, 2022, 8 Pages.

International Search Report and Written Opinion for Application No. PCT/CN2021/089578, dated Jul. 22, 2021, 8 Pages.

Samsung, "IAB MAC—rapporteur corrections and clarifications", 3GPP TSG-RAN WG2 Meeting #109Bis-e, Apr. 24, 2020, R2-2004126, 10 Pages.

* cited by examiner

TIMING ADJUSTMENT METHOD AND RELATED DEVICE

CROSS-REFERENCE TO RELATED APPLICATIONS

This application is a continuation of International Application No. PCT/CN2021/089578 filed on Apr. 25, 2021, which claims priority to Chinese Patent Application No. 202010368285.X, filed on Apr. 30, 2020, which are incorporated herein by reference in their entireties.

TECHNICAL FIELD

The present invention relates to the field of wireless communications technologies, and in particular, to a timing adjustment method and a related device.

BACKGROUND

In a wireless communications system, to improve a network capacity and coverage while taking into account a requirement for flexibility of cell deployment, the integrated access backhaul (IAB) technology is proposed. An IAB node includes a distributed unit (DU) and a mobile terminal (MT). The DU of the IAB node provides service for user equipment (UE) that accesses the IAB node. The MT may set up a wireless backhaul link with a DU of a previous-hop IAB node (such as an IAB parent node or a donor IAB node, that is, a donor IAB). The IAB node may have the following four link states: DU transmission (TX), or MT transmission, or DU reception (RX), or MT reception. Transitions can be performed between the link states. However, currently, the link state of the IAB node may not meet a timing requirement. Consequently, timing of the link state is not synchronized, a delay is caused due to interference in data transmission, and further, transmission efficiency of data transmission is reduced.

SUMMARY

According to a first aspect, an embodiment of the present invention provides a timing adjustment method, applied to a first relay device or a terminal and including:

adjusting timing of a first link state based on first signaling, where the first link state is a link state of the first relay device or the terminal; and the first signaling is provided by a parent node of the first relay device, or a parent node of the terminal, or a first network-side device, where the parent node is a last-hop device of the first relay device or the terminal.

According to a second aspect, an embodiment of the present invention further provides a timing adjustment apparatus, applied to a first relay device or a terminal and including:

a timing adjustment module, configured to adjust timing of a first link state based on first signaling, where the first link state is a link state of the first relay device or the terminal; and the first signaling is provided by a parent node of the first relay device, or a parent node of the terminal, or a first network-side device, where the parent node is a last-hop device of the first relay device or the terminal.

According to a third aspect, an embodiment of the present invention further provides a terminal or a relay device, including a memory, a processor, and a computer program stored in the memory and capable of running on the processor, where when the computer program is executed by the processor, the steps of the timing adjustment method according to the first aspect are implemented.

According to a fourth aspect, an embodiment of the present invention further provides a computer-readable storage medium, where the computer-readable storage medium stores a computer program, and when the computer program is executed by a processor, the steps of the timing adjustment method according to the first aspect are implemented.

According to a fifth aspect, an embodiment of the present invention further provides a chip, where the chip includes a processor and a communications interface, the communications interface is coupled to the processor, and the processor is configured to run a program or instructions to implement the steps of the timing adjustment method according to the first aspect.

According to a sixth aspect, an embodiment of the present invention further provides a computer software product, where the computer software product is stored in a non-volatile storage medium, and when the software product is executed by at least one processor, the software product is configured to implement the steps of the timing adjustment method according to the first aspect.

DETAILED DESCRIPTION

The following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention shall fall within the protection scope of the present invention.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: A alone, B alone, or both A and B.

In the embodiments of the present invention, terms such as "an example" or "for example" are used to represent examples, illustrations, or explanations. Any embodiment or design solution described as "an example" or "for example" in the embodiments of the present invention should not be construed as being more preferred or advantageous than other embodiments or design solutions. To be precise, the words such as "an example" or "for example" are intended to present a related concept in a specific manner.

The following describes in detail a timing adjustment method provided in the embodiments of this application by using specific embodiments and application scenarios thereof with reference to the accompanying drawings.

Figure 1:
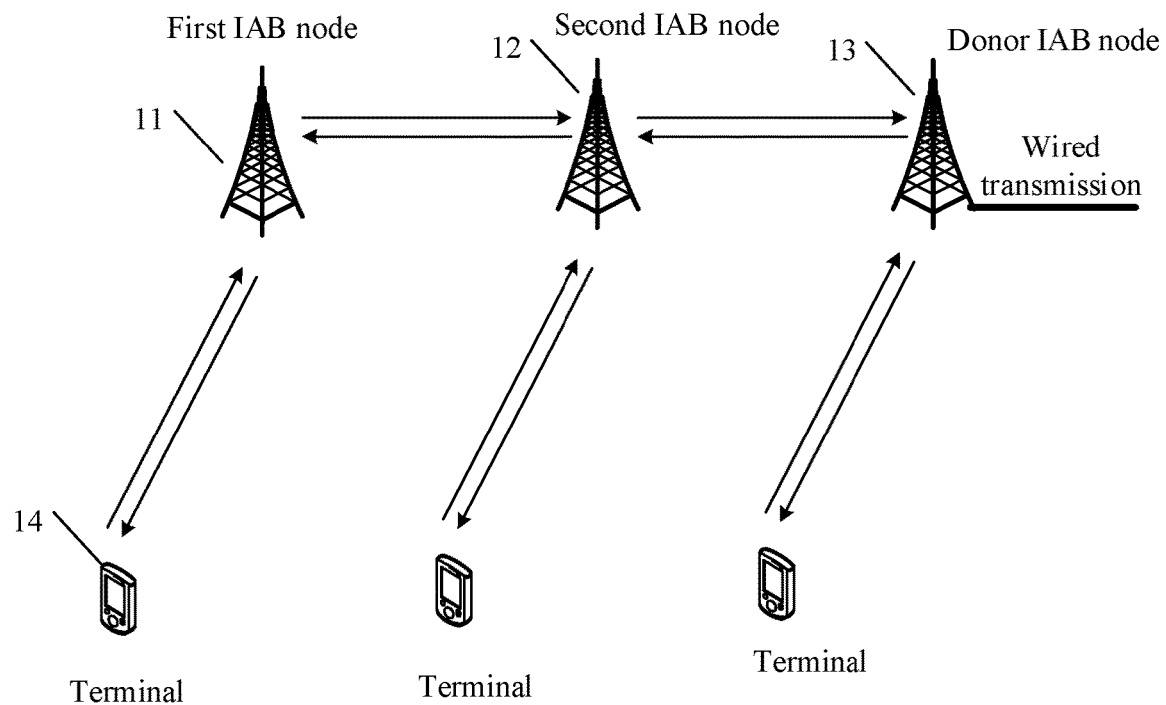
FIG. 1 is a schematic structural diagram of an IAB system according to an embodiment of the present invention.

FIG. 1 is a schematic structural diagram of an integrated access backhaul (IAB) system according to an embodiment of the present invention. As shown in FIG. 1, the IAB system includes at least two IAB nodes (such as a first IAB node 11 and a second IAB node 12), a donor IAB node 13, and a terminal (UE) 14. Each IAB node includes a distributed unit (Distributed Unit, DU) and a mobile terminal (MT). The DU of the IAB node provides an access service for the access terminal 14. The MT can establish a wireless backhaul link with a DU of a last-hop IAB node, that is, an IAB parent node (for example, the second IAB node 12 is an IAB parent node of the first IAB node 11, and the donor IAB node 13 is an IAB parent node of the second IAB node 12, while the donor IAB node 13 is a network-side device and includes a CU) to perform data transmission. The donor IAB node 13 is provided with a DU and a backhaul link of the donor IAB node 13 is for wired transmission. Certainly, FIG. 1 shows only a case that the IAB nodes include the first IAB node 11 and the second IAB node 12. An actual IAB system may include more IAB nodes, or only one IAB node (that is, there is only one IAB node, and a corresponding network device is a parent node of the IAB node). This is not limited herein.

Figure 2:
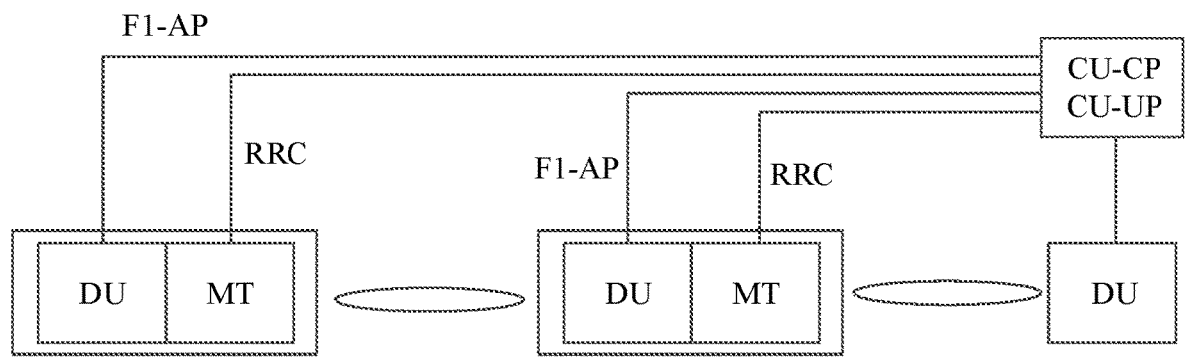
FIG. 2 is a schematic diagram of a CU-DU structure of an IAB system according to an embodiment of the present invention.

In addition, FIG. 2 is a schematic diagram of a centralized unit-DU (CU-DU) structure according to an embodiment of the present invention. As shown in FIG. 2, in an IAB system, DUs of all IAB nodes are connected to a CU node, the CU node can configure the DUs through the F1 application (F1-AP) protocol, and the CU configures MTs through the radio resource control (RRC) protocol. Alternatively, a DU of a parent node of an IAB node configures an MT of the IAB node through RRC. Introduction of the IAB system in wireless communication (for example, 5$^{th}$ Generation (5G) new radio (NR)) can resolve a situation of complex deployment of a wired transmission network and high overheads when access points are densely deployed. In other words, when there is no wired transmission network, an access point can rely on wireless backhaul to implement data transmission and transmit backhaul information of the IAB node.

Figure 3:
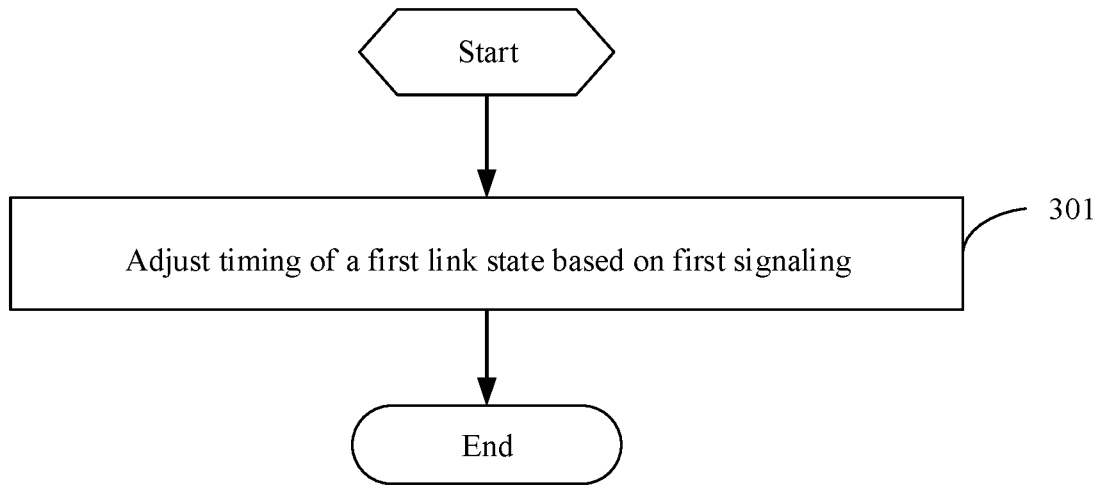
FIG. 3 is a schematic flowchart of a timing adjustment method according to an embodiment of the present invention.

FIG. 3 is a schematic flowchart of a timing adjustment method according to an embodiment of the present invention. The method is applied to a first relay device or a terminal. As shown in FIG. 3, the timing adjustment method includes:

Step 301: Adjust timing of a first link state based on first signaling.

The first link state is a link state of the first relay device or the terminal.

The first signaling is provided by a parent node of the first relay device, or a parent node of the terminal, or a first network-side device, where the parent node is a last-hop device of the first relay device or the terminal.

Herein, the first relay device or the terminal can adjust the timing of its link state based on the first signaling, so that when the timing of the first relay device or the terminal does not meet a requirement, the timing can be adjusted in time and that frequency division multiplexing (FDM) or space division multiplexing (SDM) can be performed between an MT and a DU. In this way, spectrum utilization is improved, a data transmission delay is reduced, and further, transmission efficiency of a wireless communications system is improved.

It should be noted that, that the first signaling is provided by the parent node of the first relay device may include that the parent node of the first relay device transmits the first signaling to the first relay device. Implementation principles of providing the first signaling by the parent node of the terminal and providing the first signaling by the first network-side device may be similar to this. Details are not described herein again.

In this application, the first signaling may be any signaling used to instruct the first relay device or the terminal to adjust the timing of the link state. Specifically, the first signaling is radio resource control (RRC) signaling, medium access control control element (MAC CE) signaling, downlink control information (DCI) signaling, a physical downlink control channel (PDCCH), or a backhaul application protocol control protocol data unit (BAP control PDU).

The first signaling is provided by the parent node of the first relay device, or the parent node of the terminal, or the network-side device. The parent node of the first relay device or the terminal may be a relay device or a network-side device (may be a centralized unit).

In addition, the first signaling may alternatively be provided by a parent node of a second relay device to the second relay device, and provided by the second relay device to the first relay device or the terminal. The second relay device may be the first relay device, and the adjusting timing of a first link state based on first signaling may include the following:

The first relay device receives the first signaling provided by the network-side device, and the first relay device adjusts the timing of its link state (that is, the first link state);

the first relay device receives the first signaling provided by the second relay device, where the first signaling is provided to the second relay device by the network-side device or a last-hop relay device of the second relay device, and the first relay device adjusts the timing of its link state (that is, the first link state);

the terminal receives the first signaling provided by its parent node (which may be the first relay device or the second relay device), where the first signaling is provided by the network-side device to the first relay device or the second relay device, and the terminal adjusts the timing of its link state (that is, the first link state); for example, in a case that the first relay device receives the first signaling transmitted by the network-side device, a next-hop terminal of the first relay device (that is, a terminal served by the first relay device) may adjust timing of its link state based on the first signaling; or a next-hop terminal of the second relay device (that is, a terminal served by the second relay device) may adjust timing of its link state based on the first signaling;

among other manners.

It should be noted that the relay device (including the first relay device) in this application may be any device with a relay function. Specifically, the relay device may be an IAB node. Herein, the first relay device may be a first IAB node. In addition, the second relay device may be a second IAB node, and the second IAB node is the parent node of the first IAB node (or it may be known that child nodes of the second IAB node include the first IAB node and the terminal). For example, the first IAB node may be the first IAB node 11 shown in FIG. 1, the second IAB node may be the second IAB node 12 shown in FIG. 1, and the terminal may be the next-hop terminal 14 of the first IAB node 11 or the second IAB node 12 shown in FIG. 1. In this case, the adjusting timing of a first link state based on first signaling may include at least one of the following manners:

in a manner 1, the first IAB node receives the first signaling provided by the CU, and the first IAB node adjusts the timing of its link state (that is, the first link state);

in a manner 2, the first IAB node receives the first signaling provided by the second IAB node, where the first signaling is provided to the second IAB node by the CU or a last-hop node of the second IAB node, and the first IAB node adjusts the timing of its link state (that is, the first link state);

in a manner 3, the first IAB node receives the first signaling provided by the second IAB node or the CU and provides information of the first signaling to the terminal served by the first IAB node (that is, the parent node of the terminal is the first IAB node), and the terminal served by the first IAB node adjusts the timing of the link state (that is, the first link state) of the terminal;

in a manner 4, the first IAB node receives the first signaling directly provided by the CU, and the first IAB node transmits or provides the first signaling through the second IAB node to the terminal served by the second IAB node (that is, the parent node of the terminal is the second IAB node), or the parent node (that is, the second IAB node) of the first IAB node transmits the first signaling to the terminal served by the second IAB node, and the terminal served by the second IAB node adjusts the timing of the link state (that is, the first link state) of the terminal;

among other manners.

The terminal receives the first signaling provided by its parent node (which may be the first IAB node or the second IAB node), where the first signaling is provided to the second IAB node by the network-side device or the last-hop IAB of the second IAB node, and the terminal adjusts the timing of its link state (that is, the first link state).

In this application, because the IAB nodes (including the first IAB node, the second IAB node, and other IAB nodes) each include an MT and a DU, and both the MT and the DU can perform data TX or reception RX, in a case of half duplex (Half duplex) between the MT and the DU of the IAB node, link states of the first IAB node for data transmission may include MT TX, MT RX, DU TX, and DU RX; in a case that full duplex is supported or only reception is supported between the MT and the DU of the IAB node, data reception of the MT and data reception of the DU can be performed simultaneously; in a case that full duplex is supported or only transmission is supported between the MT and the DU of the IAB node, data transmission of the MT and data transmission of the DU can be performed simultaneously; or in a case that full duplex is supported between the MT and the DU of the IAB node, simultaneous transmission and reception can be supported. Therefore, the link state of the first IAB node for data transmission may also be as follows:

DU TX and MT TX work simultaneously (DU TX and MT TX for short), that is, the DU and the MT transmit data simultaneously;

DU RX and MT RX work simultaneously (DU RX and MT RX for short), that is, the DU and the MT receive data simultaneously;

DU RX and MT TX work simultaneously (DU RX and MT TX for short), that is, the DU receives data and the MT transmits data simultaneously; and DU TX and MT RX work simultaneously (DU TX and MT RX for short), that is, the DU transmits data and the MT receives data simultaneously.

In some cases, the data transmission of the MT and the data reception of the DU may be referred to as "uplink" (UL), and the data reception of the MT and the data transmission of the DU are referred to as "data downlink" (DL). Therefore, in a case that MT TX is replaced with MT UL, and MT RX is replaced with MT DL, and DU TX is replaced with DU DL, and DU RX is replaced with DU UL, the timing adjustment method in this application can also be implemented.

In addition, research on timing synchronization of IAB nodes based on synchronization rules finds that a variety of timing synchronization schemes are available at present. For example, seven schemes for IAB node synchronization are defined in a research phase of R16. Certainly, the schemes for IAB node timing synchronization are not limited to the seven schemes defined in the research phase of R16. The following describes schemes 1, 6, and 7 in detail.

In the scheme 1 (that is, a case 1), DU TX of the IAB node is aligned with TX of the IAB parent node in a time domain unit (in this case, the IAB parent node may be a base station) in timing, or DU TX is aligned with DU TX of the IAB parent node (in this case, the IAB parent node may be an IAB node) in a time domain unit in timing, where the IAB parent node is the parent node of the IAB node.

In the scheme 6 (that is, a case 6), MT TX and DU TX of the IAB node are aligned on time domain unit, or MT TX and DU TX work simultaneously (that is, simultaneous transmission); and DU TX of the IAB node is aligned with TX of the IAB parent node in a time domain unit in timing, or DU TX of the IAB node is aligned with DU TX of the IAB parent node in a time domain unit in timing.

In the scheme 7 (that is, a case 7), MT RX and DU RX of the IAB node are aligned on time domain unit, or MT RX and DURX work simultaneously (that is, simultaneous reception); and DU RX of the IAB node is aligned with RX of the IAB parent node in a time domain unit in timing, or DU RX of the IAB node is aligned with DU RX of the IAB parent node in a time domain unit in timing, or the like.

The time domain unit may be any one of symbol, symbol set, slot, subframe, frame, microsecond, millisecond, second, and the like. It should be noted that, in the foregoing schemes for IAB node synchronization, the time domain units may be different or the same. For example, in the case 6, MT TX and DU TX may be aligned on symbol (which is the time domain unit on which MT TX and DU TX are aligned), and DU TX is aligned in timing with TX of the IAB parent node on slot (which is the time domain unit on which DU TX is aligned with TX of the IAB parent node in timing); or MT TX and DU TX may be aligned on symbol, and DU TX is also aligned with TX of the IAB parent node on symbol in timing.

In addition, in the research on timing synchronization of the IAB nodes based on the synchronization rules, a timing advance (TA) may be obtained according to the synchronization rules, and timing of the IAB nodes is adjusted based on the TA. For example, in conventional timing synchronization (such as R15 NR), uplink timing can be implemented by using a notification from the network-side device (such as the base station), the foregoing TA can be used to indicate an advance of uplink transmission (UL TX) of the terminal with respect to downlink reception (DL RX) of the terminal, and the TA is calculated by using the following formula (1):

$$TA = (N_{TA} + N_{TA\_offset}) \cdot T_c \qquad (1)$$

Figure 4:
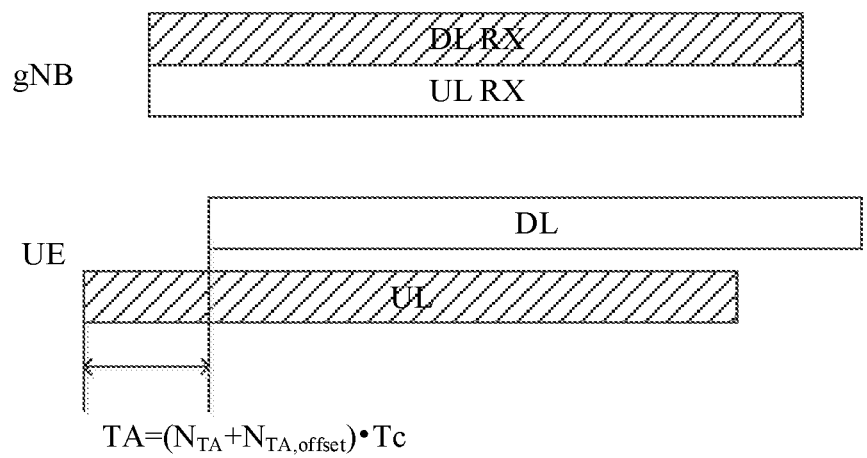
FIG. 4 is a first schematic principle diagram of timing synchronization of an IAB node according to an embodiment of the present invention.

As shown in FIG. 4, in timing synchronization of the IAB (such as an R16 IAB), timing of DU TX is implemented by using a notification from the IAB parent node, and the TA is used to indicate a timing advance of DU TX of the IAB node with respect to MT RX and is calculated by using the following formula (2):

$$TA = (N_{TA} + N_{TA\_offset}) \cdot T_c/2 + T_{delta} \qquad (2)$$

$N_{TA\_offset}$ is a parameter indicated by radio resource control (RRC) or uses a default value.

$T_c$ is a smallest time unit.

$N_{TA}$ may be obtained in the following two manners.

1. A random access response (RAR) carries 12 bits of information, indicating TA=0, 1, 2, . . . , 3846, and $N_{TA} = T_A \cdot 16 \cdot 64 / 2^u$ is obtained based on an indicated value, where u indicates a sub-carrier spacing (SCS) parameter.

2. A medium access control control element (MAC CE) carries 6 bits of indication information, indicating TA=0, 1, 2, . . . , 63, and $N_{TA\_new} = N_{TA\_old} + (T_A - 31) \cdot 16 \cdot 64 / 2^u$ is obtained based on an indicated value, where the $N_{TA\_old}$ is a previous TA value, and a new TA value is obtained through adjustment based on an indication of the MAC CE.

In this application, the first link state may be a link state in a transmission mode (which may also be referred to as a timing mode) corresponding to any one of the foregoing timing synchronization schemes. Specifically, the first link state may be a link state in a first transmission mode, where the first transmission mode is that mobile terminal transmission MT TX and distributed unit transmission DU TX of the IAB node are aligned on time domain unit or work simultaneously, that is, the first transmission mode is a transmission mode corresponding to the foregoing case 6.

In addition, in a case that the first link state is a link state of the first IAB node, the first link state may include at least one of MT TX, MT RX, DU TX, and DU RX; or in a case that the first link state is a link state of the terminal, the first link state may include at least one of TX and RX of the terminal.

Specifically, the first link state may include at least one of the following:

at least one of MT TX and DU TX of the first IAB node; and

TX of the terminal, where the terminal is served by the parent node of the first IAB node.

The first link state includes at least one of MT TX and DU TX of the first IAB node, which may, for example, work in the case of the foregoing manner 1, that is, in a case that the first IAB node receives the first signaling transmitted or provided by the CU, the first IAB node adjusts at least one of MT TX and DU TX of the first IAB node.

In addition, the first link state includes TX of the terminal served by the parent node of the first IAB node, which may, for example, work in the case of the foregoing manner 4, that is, in a case that the first IAB node receives the first signaling directly provided by the CU, the first IAB node provides the first signaling through the second IAB node to the terminal served by the second IAB node, and the terminal served by the second IAB node adjusts the timing of TX of the terminal based on the first signaling.

In this application, the first link state may alternatively be a link state in a second transmission mode, where the second transmission mode is that mobile terminal reception MT RX and distributed unit reception DU RX of the IAB node are aligned on time domain unit or work simultaneously, that is, the second transmission mode is a transmission mode corresponding to the foregoing case 7.

In a case that the first link state is a link state in the second transmission mode, the first link state may include at least one of the following:

MT RX and/or DU RX of the first IAB node;

MT TX of the first IAB node, where the parent node of the first IAB node is the second IAB node, and the first signaling is signaling provided by the second IAB node to the first IAB node; and TX of the terminal, where the terminal is served by the first IAB node.

Similarly, the first link state includes at least one of MT TX and DU TX of the first IAB node, which may, for example, occur in the case of the foregoing manner 1, that is, in a case that the first IAB node receives the first signaling transmitted or provided by the CU, the first IAB node adjusts at least one of MT TX and DU TX of the first IAB node.

The first link state includes MT TX of the first IAB node, which may, for example, occur in the case of the foregoing manner 2, that is, in a case that the second IAB node receives the first signaling transmitted or provided by the CU or the last-hop IAB node, the second IAB node provides the first signaling to its child node, that is, the first IAB node, and the first IAB node adjusts timing of MT TX of the first IAB node.

In addition, the first link state includes TX of the terminal served by the first IAB node, which may occur in the case of the foregoing manner 3, that is, in a case that the first IAB node receives the first signaling provided by the CU or the second IAB node, the first IAB node transmits the first signaling to the terminal served by the first IAB node, and the terminal served by the first IAB node adjusts timing of TX of the terminal based on the first signaling.

In this application, the adjusting timing of a first link state based on first signaling may be: the first signaling carries parameters used for timing adjustment, and the first IAB node or the terminal obtains a new TA (referred to as $TA_{new}$) based on the parameters carried in the first signaling and adjusts the timing of the first link state by using the $TA_{new}$.

For example, the $TA_{new}$ may be obtained according to a conventional manner of obtaining TA, for example, according to the foregoing formula (1), that is, $TA_{new} = (N_{TA} + N_{TA\_offset}) \cdot T_c$.

Alternatively, the $TA_{new}$ may be obtained according to a conventional manner of obtaining a TA by an IAB node, for example, obtained according to the foregoing formula (2), that is, $TA_{new}=(N_{TA}+N_{TA\_offset})\cdot T_c/2+T_{delta}$.

Alternatively, in a case that the first link state is a link state in the first transmission mode, the first signaling may include at least one of the following:

an offset $T_{additional}$ of a timing advance TA, where the TA is obtained based on $N_{TA}$ and $N_{TA,offset}$;

the $N_{TA}$ and the $N_{TA,offset}$; and $T_{delta}$, where the $T_{delta}$ is used to adjust timing of DU TX of the first IAB node.

It should be noted that the TA is obtained based on the $N_{TA}$ and $N_{TA,offset}$. It may be understood that the TA is $TA_{new}$ obtained in a conventional manner. For example, the TA is calculated by using the foregoing formula (1), that is, $TA=(N_{TA}+N_{TA\_offset})\cdot T_c$.

It can be learned from above that, in the case that the first link state is a link state in the first transmission mode, the new TA used to adjust the timing of the first link state is obtained based on the parameters in the first signaling. Specifically, the following manners may be included:

The $TA_{new}$ is a sum of the TA and $T_{additional}$, that is, $TA_{new}=(N_{TA}+N_{TA\_offset})\cdot T_c+T_{additional}$;

the $TA_{new}$ is calculated based on the $N_{TA}$ and $N_{TA,offset}$, for example, $TA_{new}=(N_{TA}+N_{TA\_offset})\cdot T_c/2$;

the $TA_{new}$ is calculated based on the $T_{delta}$, for example, may be a sum of a proportion of the TA and the $T_{delta}$, for example, $TA_{new}=TA/2+T_{delta}$;

the $TA_{new}$ is calculated based on the $T_{delta}$, $N_{TA}$, and $N_{TA,offset}$, for example, may be $TA_{new}=(N_{TA}+N_{TA\_offset})\cdot T_c/2+T_{delta}$; and the $TA_{new}$ is calculated based on the $T_{delta}$, $N_{TA}$, and $N_{TA,offset}$, for example, may be $TA_{new}=(N_{TA}+N_{TA\_offset})\cdot T_c/2+T_{delta}+T_{additional}$; in this case, the $T_{additional}$ may be used to adjust the timing of MT TX and DU TX, or may be used to adjust symbol alignment at a time of MT TX and DU TX.

It should be noted that the $T_{additional}$ may be a value defined or configured in a protocol based on an actual situation. For example, it may be a value configured or indicated by the first signaling of the RRC signaling or MAC CE; or the $T_{additional}$ may be a default value, the default value may be $-(N_{TA}+N_{TA\_offset})\cdot T_c/2$, and in this case, slot-level alignment can be implemented; or the $T_{additional}$ may be configured to be the same as $-(N_{TA}+N_{TA\_offset})\cdot T_c/2+T_{dalta}$.

In addition, in a case that the $TA_{new}$ is calculated based on the $N_{TA}$ and $N_{TA,offset}$, the first signaling may be existing notification signaling in the wireless communications system (such as NR), that is, TA signaling of an MT of an existing IAB node is reused, so that resource overheads are reduced.

It should also be noted that, adjusting the timing of DU TX of the first IAB node by using the $T_{delta}$ may be adjusting the timing of DU TX of the IAB node based on the $T_{delta}$ and other parameters, for example, adjusting the timing of DU TX of the IAB node based on the $T_{delta}$, $N_{TA}$, and $N_{TA,offset}$. This is not limited herein.

Alternatively, the first signaling may directly carry the $TA_{new}$. Specifically, the first signaling includes at least two first TAs, and at least one of the at least two first TAs is used to indicate a TA a DU TX and/or MT TX occasion of the first IAB node, that is, the first TA is the new TA $TA_{new}$.

It should be noted that, actually, a part of the at least two first TAs may be conventional TAs and a part thereof are $TA_{Snew}$, and the conventional TA and $TA_{new}$ in the at least two first TAs may be configured according to a preset rule.

Specifically, the at least two first TAs include at least one of the following:

a TA based on an independent configuration, a difference configuration, or a ratio configuration.

It should be noted that the independent configuration may be so understood that the at least two first TAs are independent of each other and there is no association between any two first TAs. The difference configuration may be that a part of the first TAs are determined based on a difference between another first TA and a preset value, and if there are a plurality of differences, the plurality of differences may be the same difference or different differences. For example, each $TA_{new}$ may be a difference between a conventional TA and the preset value. The ratio configuration may be that a part of the first TAs are determined based on another first TA and a preset ratio. For example, each $TA_{new}$ may be a product of a conventional TA and the preset ratio. For example, the $TA_{new}$ is half of a corresponding conventional TA.

Alternatively, in a case that the first link state is a link state in the second transmission mode, the first signaling includes at least one of the following:

an advance beta of DU TX with respect to DU RX; and an offset gamma of a TA.

In the case that the first link state is a link state in the second transmission mode, the new TA used to adjust the timing of the first link state is obtained based on the parameters in the first signaling. Specifically, the $TA_{new}$ may be a difference between the TA and beta. For example, $TA=(N_{TA}+N_{TA,offset})*Tc$-beta. Alternatively, the $TA_{new}$ may be a sum of the TA and gamma, or the like.

It should be noted that the beta or gamma may be a value defined or configured in a protocol based on an actual situation. For example, the beta may be a default value, and the default value may be $(N_{TA}+N_{TA,offset})\cdot T_c/2$, that is, the TA indicated by the second IAB node to the first IAB node, or the like.

Alternatively, in the case that the first link state is a link state in the second transmission mode, the first signaling may also directly carry the $TA_{new}$. Specifically, the first signaling includes at least two second TAs, and at least one of the at least two second TAs is used to indicate a TA of DU RX and/or MT RX of the IAB node, or indicate a TA of MT TX of the IAB child node, or indicate a TA of TX of the terminal served by the IAB node.

It should be noted that, actually, a part of the at least two second TAs may be conventional TAs and a part thereof are $TA_{Snew}$, and the conventional TA and $TA_{new}$ in the at least two second TAs may be configured according to a preset rule. In addition, the second TAs and the first TAs may be the same TA or different TAs.

Specifically, the at least two second TAs include at least one of the following:

a TA based on an independent configuration, a difference configuration, or a ratio configuration.

Similarly, the independent configuration may be so understood that the at least two second TAs are independent of each other and there is no association between any two second TAs. The difference configuration may be that a part of the second TAs are determined based on a difference between another second TA and a preset value. For example, each $TA_{new}$ may be a difference between a conventional TA and the preset value. The ratio configuration may be that a part of the second TAs are determined based on another second TA and a preset ratio. For example, each $TA_{new}$ may be a product of a conventional TA and the preset ratio. For example, the $TA_{new}$ is half of a corresponding conventional TA.

In this application, in the case that the first link state is a link state in the first transmission mode, the first signaling carries the parameters used to adjust the timing of the first link state, and may further implement other functions.

Specifically, the first signaling may be further used to indicate an effective time of the at least two first TAs, and may include at least one of a start effective time, effective duration, and an end effective time, so that an effective time of the first signaling is determined for the adjustment.

For example, a start time period or an end time period in which one of the at least two first TAs is effective on at least one of MT TX and DU TX may be defined.

In addition, the first signaling may be further used to indicate that MT TX and DU TX of the first IAB node are synchronized or aligned on time domain unit. For example, the first signaling may indicate that MT TX and DU TX of the first IAB node are aligned on slot or aligned on symbol.

In this application, because the first signaling may be RRC signaling, MAC CE signaling, DCI signaling, or the like, in a case that the first signaling is RRC signaling, MAC CE signaling, or DCI signaling and that the first link state is a link state in the first transmission mode, the RRC signaling, the MAC CE signaling, or the DCI signaling may be further used to indicate that the at least two first TAs or the at least two second TAs are the same or different.

In some implementations, in a case that the first signaling is RRC signaling or MAC CE signaling and that the first link state is a link state in the first transmission mode, the RRC signaling or MAC CE signaling is used for any one of the following:

indicating that MT TX follows timing of DU TX;
indicating a carrier or carrier set of DU TX followed by MT TX;
indicating a slot or slot set of DU TX followed by MT TX; and
indicating an orthogonal frequency division multiplexing (OFDM) symbol or a symbol set of DU TX followed by MT TX.

It should be noted that the slot or the slot set and the OFDM symbol or the symbol set may appear periodically and are indicated by a timing pattern, and MT TX of other slots or OFDM symbols not indicated by the timing pattern may follow timing of a conventional TA.

In addition, the first signaling may be further used to indicate characteristics of the parameters carried in the first signaling. For example, in a case that the first signaling carries the $T_{additional}$, the first signaling may be further used to indicate characteristics of the $T_{additional}$. Specifically, the first signaling may indicate values of the $T_{additional}$ in different periods, or the like.

In other implementations, in a case that the first signaling is DCI signaling and that the first link state is a link state in the first transmission mode, the DCI signaling may further implement at least one of the following indication functions:

1. The DCI signaling carries an indication field or the DCI signaling is scrambled by using a first radio network temporary identifier RNTI, and the DCI signaling is used to indicate that MT TX follows timing of DU TX, or indicate a carrier or carrier set of DU TX followed by MT TX, or a slot or slot set of DU TX followed by MT TX, or an OFDM symbol or symbol set of DU TX followed by MT TX, where indication information of the DCI may be explicit indication or implicit indication. If the indication information is explicit indication, the DCI may carry one bit of information, where for example, the bit being 1 indicates that MT TX needs to follow the timing of DU TX, and the bit being 0 indicates that MT TX does not need to follow the timing of DU TX. If the indication information is implicit indication, it means, for example, an existing field in the DCI is reinterpreted to indicate whether MT TX needs to follow the timing of DU TX, or the indication information is jointly encoded with another field in the DCI to indicate the information.

2. The DCI signaling includes a PDCCH order, the PDCCH order is used to indicate a timing pattern of MT TX, and the timing pattern of MT TX is used to indicate that MT TX stops following or follows timing of carrier, slot, slot set, OFDM symbol, or symbol set of DU TX (herein, it means stopping following or following conventional TA timing).

3. The DCI signaling is in a first DCI format and is used to indicate that MT TX follows timing of DU TX or uses a timing rule of the first transmission mode (that is, a timing rule in the case 6).

In some implementations, second signaling is transmitted to the last-hop device, where the second signaling is used by the last-hop device to configure timing. The last-hop device may be a network-side device or a relay device. This is not limited herein.

Herein, the first IAB node or the terminal may report the second signaling, to assist the CU or the parent node thereof in performing a timing configuration and support FDM or SDM multiplexing for data transmission between the MT and the DU. In this way, spectrum utilization is improved, the data transmission delay is reduced, and further, transmission efficiency is improved.

In this implementation, the second signaling may be any signaling used to assist the CU or the parent node in performing the timing configuration. The signaling may be RRC signaling, MAC CE signaling, downlink control information DCI signaling, PDCCH, or BAP control PDU.

Specifically, in a case that the second signaling is signaling transmitted by the first IAB node to the CU or the second IAB node, the second signaling may satisfy at least one of the following:

being used to indicate whether a DU and an MT of the first IAB node share a radio frequency (RF);
being used to indicate whether the first IAB node supports synchronization or alignment on time domain unit;
being used to indicate a simultaneous transmission occasion of MT TX and DU TX expected by the first IAB node or that the first IAB node expects alignment of MT TX and DU TX on time domain unit; and
being used to indicate a transmission pattern of MT TX and/or DU TX expected by the first IAB node.

Similarly, in the case that the first link state is a link state in the second transmission mode, the first signaling carries the parameters used to adjust the timing of the first link state, and may further implement other functions.

Specifically, the first signaling may be further used to indicate an effective time of the at least two second TAs, to make the timing adjustment of the first link state more accurate.

For example, a start time period or an end time period in which one of the at least two second TAs is effective on at least one of MT RX and DU RX may be defined.

In addition, the first signaling may be further used to indicate that MT RX and DU RX of the first IAB node are synchronized or aligned on time domain unit. For example, the first signaling may indicate that MT TX and DU TX of the first IAB node are aligned on slot or aligned on symbol.

In this application, because the first signaling may be RRC signaling, MAC CE signaling, DCI signaling, or the like, in a case that the first signaling is RRC signaling, MAC CE signaling, or DCI signaling and that the first link state is a link state in the second transmission mode, the RRC signaling, the MAC CE signaling, or the DCI signaling may be further used to indicate that the at least two second TAs are the same or different.

In some implementations, the first signaling includes first indication information, where the first indication information is used to indicate negative timing advance information supported by the first link state, and the first indication information may include at least one of the following:
 a negative value used to indicate a TA; and
 an indication field used to indicate whether a TA field parameter is positive or negative.

Figure 5:
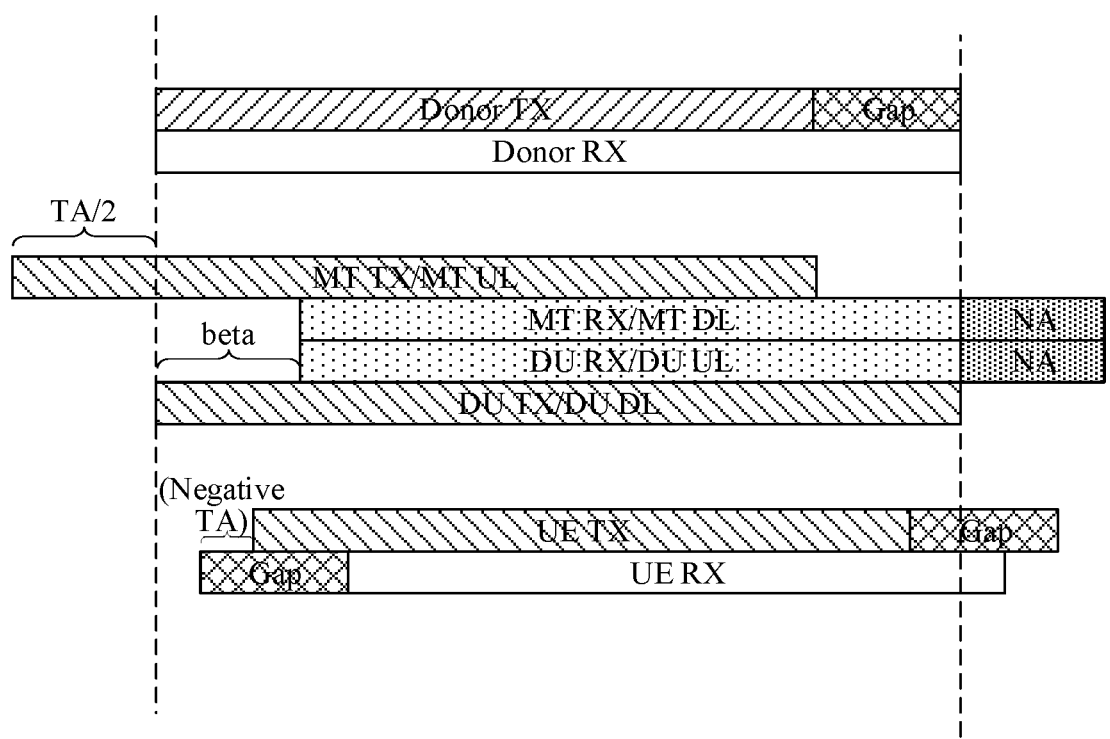
FIG. 5 is a second schematic principle diagram of timing synchronization of an IAB node according to an embodiment of the present invention.

For example, as shown in FIG. 5, the first signaling is signaling transmitted by the IAB node to its child node (which may be an IAB node or a terminal, and is a terminal in the figure). The first signaling is obtained based on a difference beta between DU RX and DU TX of the IAB node, and the signaling includes an indication that the TA value is negative. The first signaling may include an indication of a positive/negative field of a TA. If 1 is defined to represent "positive", and 0 is defined to represent "negative", to implement a negative TA in the corresponding figure, the indication of the positive/negative field of the TA is 0. In this way, the IAB node provides a negative TA indication for the terminal or IAB node served by the IAB node. Therefore, for TX of the IAB child node (for example, terminal UE TX in the figure), timing of the UE TX is determined based on RX of the IAB child node (for example, UE RX in the figure). Therefore, in the IAB node, synchronization between MT RX and DU RX can be implemented.

In addition, in a case that the first signaling is RRC signaling or MAC CE signaling, the first signaling may further include an indication for extending a range of the TA field. Specifically, a new code point may be added to the first signaling, for example, a new TA field is added or an existing TA field is extended; or a new granularity is added, or the range of the TA field indicated by the first signaling is added; or a scaling field is added to the first signaling and used to scale up or scale down the indicated range of the existing TA field.

In some implementations, in a case that the first signaling is RRC signaling or MAC CE signaling and that the first link state is a link state in the second transmission mode, the RRC signaling or MAC CE signaling is used for any one of the following:
 indicating that DU RX follows timing of MT RX;
 indicating a carrier or carrier set of MT RX followed by DU RX;
 indicating a slot or slot set of MT RX followed by DU RX; and
 indicating an orthogonal frequency division multiplexing OFDM symbol or a symbol set of MT RX followed by DU RX.

It should be noted that the slot or the slot set and the OFDM symbol or the symbol set may appear periodically and are indicated by a timing pattern, and timing of DU RX and DU TX of other slots or OFDM symbols not indicated by the timing pattern may keep consistent.

In other implementations, in a case that the first signaling is DCI signaling and that the first link state is a link state in the second transmission mode, the DCI signaling may further implement at least one of the following indication functions:

1. The DCI signaling carries an indication field or the DCI signaling is scrambled by using a first radio network temporary identifier RNTI, and the DCI signaling is used to indicate that MT RX follows timing of DU RX, or indicate a carrier or carrier set of DU RX followed by MT RX, or a slot or slot set of DU RX followed by MT RX, or an OFDM symbol or symbol set of DU RX followed by MT RX, where indication information of the DCI may be explicit indication or implicit indication. If the indication information is explicit indication, the DCI may carry one bit of information, where, for example, the bit being 1 indicates that MT RX needs to follow timing of DU RX, and the bit being 0 indicates that MT RX does not need to follow timing of DU RX. If the indication information is implicit indication, it means, for example, an existing field in the DCI is reinterpreted to indicate whether MT RX needs to follow timing of DU RX, or the indication information is jointly encoded with another field in the DCI to indicate the information.

2. The DCI signaling includes a PDCCH order, the PDCCH order is used to indicate a timing pattern of MT RX, and the timing pattern of MT RX is used to indicate that MT RX stops following or follows timing of carrier, slot, slot set, OFDM symbol, or symbol set of DU RX.

3. The DCI signaling is in a first DCI format and is used to indicate that MT RX follows timing of DU RX or uses a timing rule of the second transmission mode (that is, a timing rule in the case 7).

It should be noted that in a case that the first link state is a link state in the first transmission mode or the second transmission mode and that the first signaling being the DCI signaling includes the PDCCH order, the method may further include: transmitting response information to the network-side device (such as the CU) or the parent node of the first IAB node based on the PDCCH order. The response information may be a response made by using MAC CE or PUCCH.

For ease of understanding the timing adjustment method in this application, the following provides detailed descriptions by using an example 1 and an example 2 of the timing adjustment method in an actual application.

Example 1

Figure 6:
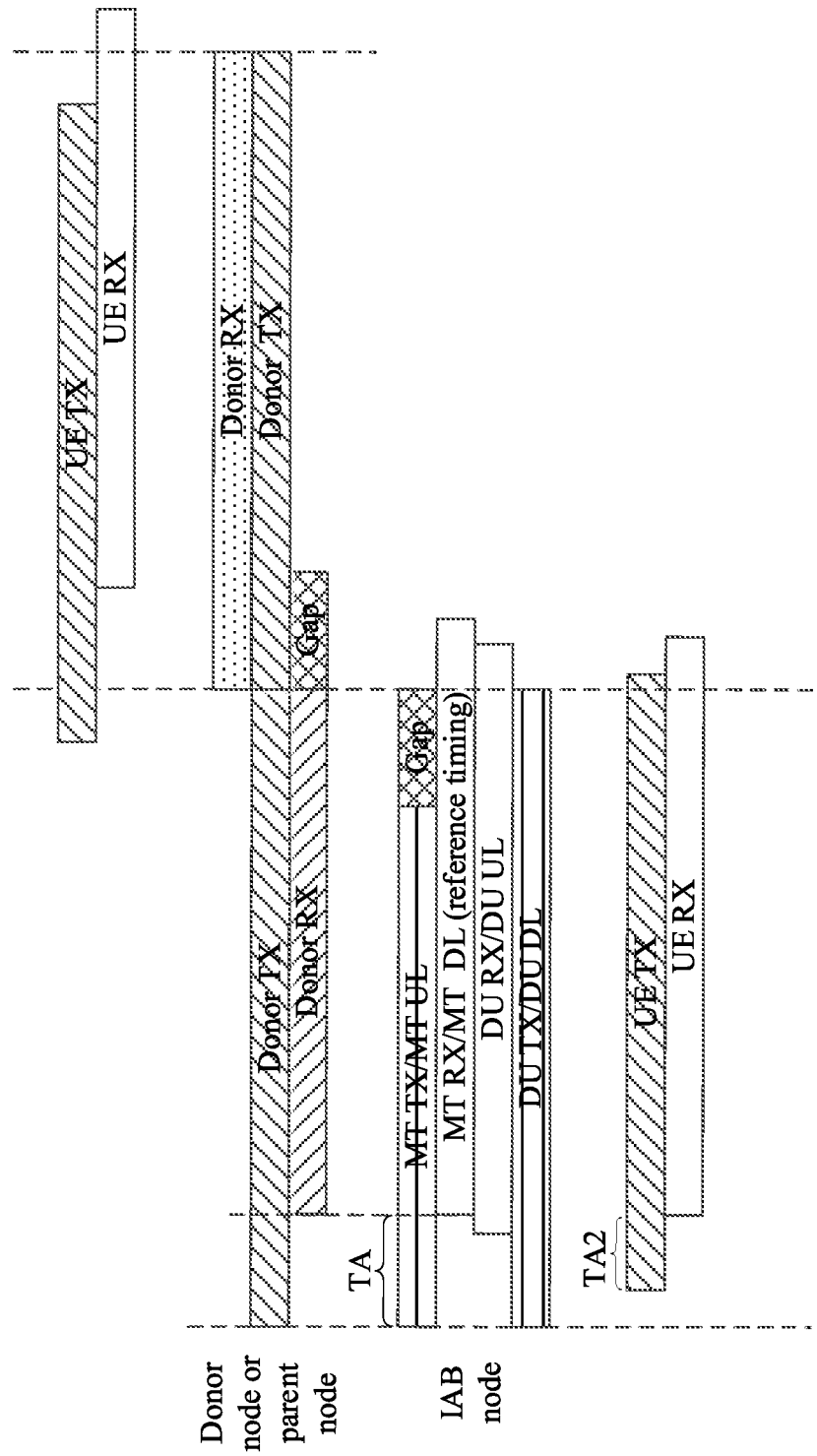
FIG. 6 is a third schematic principle diagram of timing synchronization of an IAB node according to an embodiment of the present invention.

As shown in FIG. 6, the IAB parent node needs to maintain timing of two ULs. Timing of one UL is used for the IAB node, and timing of the other UL is used for normal UE. TDM multiplexing is present between BH link RX and access link RX of one donor/parent node, that is, a TDM multiplexing relationship is present between IAB node reception and UE reception. In the IAB node, FDM multiplexing may be present between MT TX and DU TX, and there may be slot alignment or symbol alignment. If the IAB node is configured to support timing of the case 6 in a slot n (that is, corresponding to a first slot in FIG. 6), an offset between TX and RX of the IAB parent node is TA/2. The parent node transmits the offset between TX and RX and a conventional TA value to the IAB node by using the first signaling. The IAB node obtains a timing advance based on the provided first signaling, and adjusts timing of MT TX based on corresponding timing of MT RX, to implement alignment between MT TX and DU TX.

Figure 7:
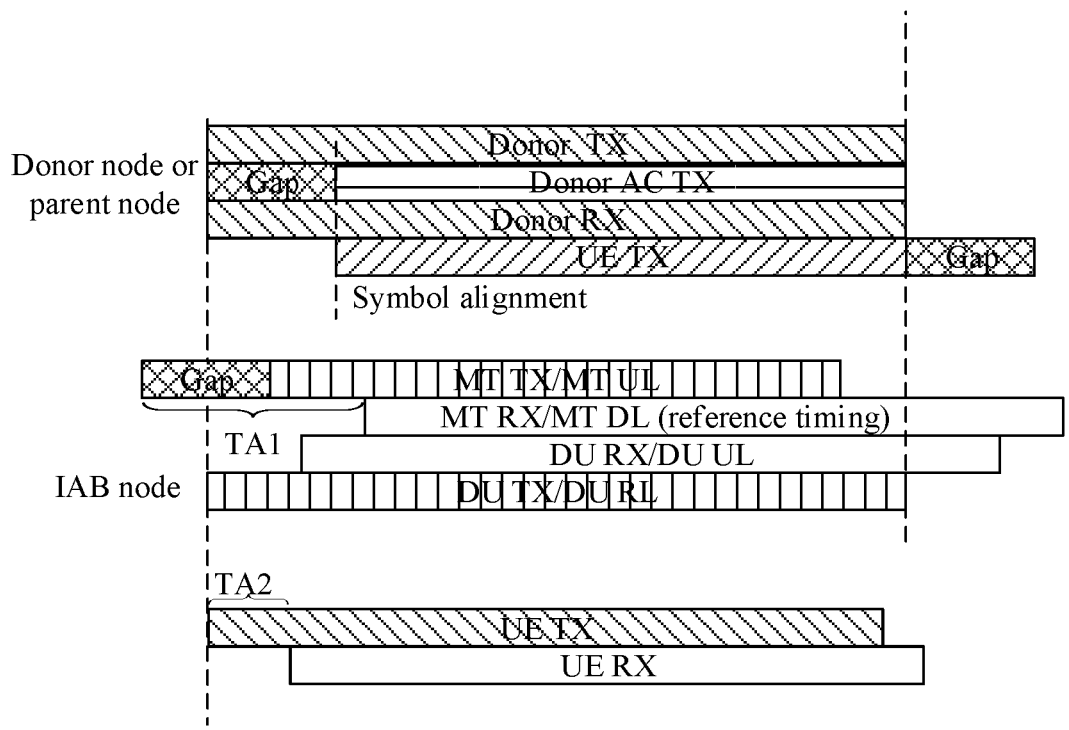
FIG. 7 is a fourth schematic principle diagram of timing synchronization of an IAB node according to an embodiment of the present invention.

As shown in FIG. 7, if the IAB supports two RFs, that is, the MT and the DU do not require symbol alignment, the IAB node reports its capability of supporting two RFs. In this case, the IAB parent node performs symbol alignment between its TX and RX, and provides an offset to the IAB node by using the first signaling. The IAB node adjusts timing of MT TX based on the provided information and timing of MT RX, to implement symbol alignment on the IAB parent node. An FDM multiplexing mode may be present between backhaul link RX and access link RX of the IAB parent node.

Example 2

Figure 8:
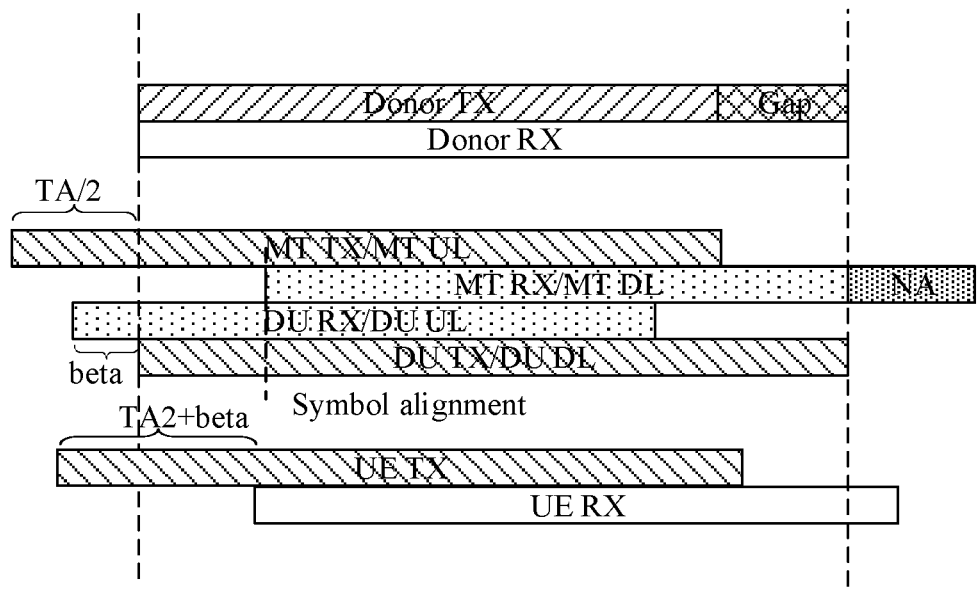
FIG. 8 is a fifth schematic principle diagram of timing synchronization of an IAB node according to an embodiment of the present invention.

Herein, slot boundary synchronization or symbol synchronization may be implemented on the IAB node by performing timing adjustment, as shown in FIG. 8.

The IAB node notifies the IAB child node (for example, UE in the figure) based on an offset (a difference beta corresponding to symbol alignment in the figure) between DU RX and DU TX of the IAB node by using the first signaling, where the first signaling is a TA offset indication. In addition, the IAB node notifies the UE of a second TA value of the IAB node (that is, a TA2 in the figure), where the second TA value is indicated as conventional TA indication information. The IAB child node adjusts a timing advance of TX (for example, UE TX in the figure) of the IAB child node to a sum of the second TA and beta (that is, TA2+beta in the figure) based on the obtained information and RX timing of the IAB child node (for example, UE RX in the figure). Therefore, in the IAB node, symbol alignment can be implemented between MT RX and DU RX.

Figure 9:
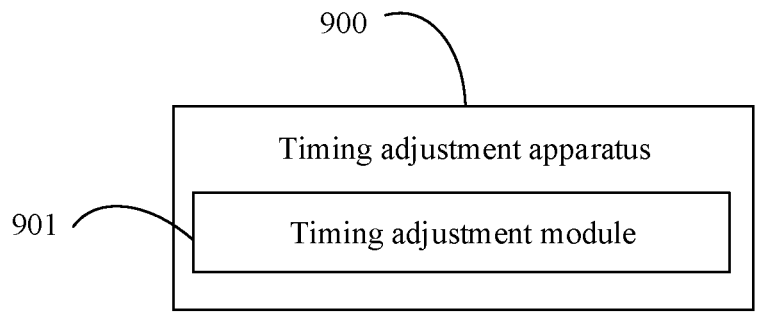
FIG. 9 is a first schematic structural diagram of a timing adjustment apparatus according to an embodiment of the present invention.

FIG. 9 is a timing adjustment apparatus according to an embodiment of the present invention. The apparatus is applied to a first relay device or a terminal. As shown in FIG. 9, the timing adjustment apparatus 900 includes:
- a timing adjustment module 901, configured to adjust timing of a first link state based on first signaling, where
- the first link state is a link state of the first relay device or the terminal; and
- the first signaling is provided by a parent node of the first relay device, or a parent node of the terminal, or a first network-side device, where the parent node is a last-hop device of the first relay device or the terminal.

Optionally, the first relay device is a first integrated access backhaul IAB node.

Optionally, the first link state is a link state in a first transmission mode, where
- the first transmission mode is that mobile terminal transmission MT TX and distributed unit transmission DU TX of the IAB node are aligned on time domain unit or work simultaneously.

Optionally, the first link state includes at least one of the following:
- MT TX and/or DU TX of the first IAB node; and
- TX of the terminal, where the terminal is served by the parent node of the first IAB node.

Optionally, the first signaling includes at least one of the following:
- an offset $T_{additional}$ of a timing advance TA, where the TA is obtained based on $N_{TA}$ and $N_{TA,offset}$;
- the $N_{TA}$ and the $N_{TA,offset}$; and
- $T_{delta}$, where the $T_{delta}$ is used to adjust timing of DU TX of the first IAB node.

Optionally, the first signaling includes at least two first TAs, and at least one of the at least two first TAs is used to indicate a TA at a DU TX and/or MT TX occasion of the first IAB node.

Optionally, the at least two first TAs include at least one of the following:
- a TA based on an independent configuration, a difference configuration, or a ratio configuration.

Optionally, the first signaling is used to indicate an effective time of the at least two first TAs.

Optionally, the first signaling is further used to indicate that MT TX and DU TX of the first IAB node are synchronized or aligned on time domain unit.

Figure 10:
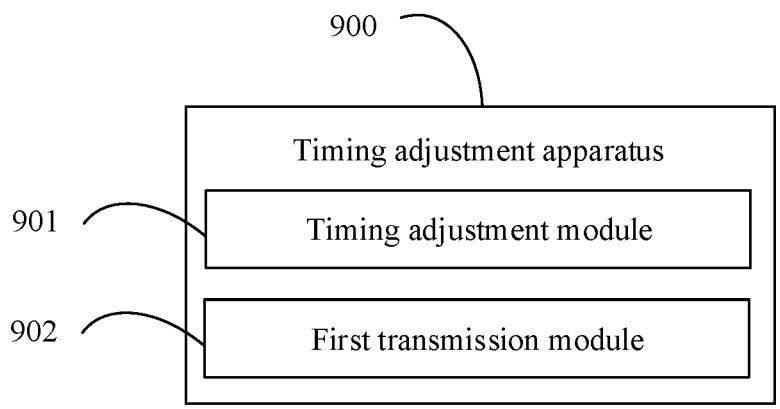
FIG. 10 is a second schematic structural diagram of a timing adjustment apparatus according to an embodiment of the present invention.

Optionally, as shown in FIG. 10, the apparatus 900 further includes:
- a first transmission module, configured to transmit second signaling to the last-hop device, where the second signaling is used by the last-hop device to configure timing.

Optionally, the second signaling satisfies at least one of the following:
- being used to indicate whether a DU and an MT of the first IAB node share a radio frequency RF;
- being used to indicate whether the first IAB node supports synchronization or alignment on time domain unit;
- being used to indicate a simultaneous transmission occasion of MT TX and DU TX expected by the first IAB node or that the first IAB node expects alignment of MT TX and DU TX on time domain unit; and
- being used to indicate a transmission pattern of MT TX and/or DU TX expected by the first IAB node.

Optionally, the first link state is a link state in a second transmission mode, where
- the second transmission mode is that mobile terminal reception MT RX and distributed unit reception DU RX of the first IAB node are aligned on time domain unit or work simultaneously.

Optionally, the first link state includes at least one of the following:
- MT RX and/or DU RX of the first IAB node;
- MT TX of the first IAB node, where the parent node of the first IAB node is a second IAB node, and the first signaling is signaling provided by the second IAB node to the first IAB node; and
- TX of the terminal, where the terminal is served by the first IAB node.

Optionally, the first signaling includes at least one of the following:
- an advance beta of DU TX with respect to DU RX; and
- an offset gamma of a TA.

Optionally, the first signaling includes at least two second TAs, and at least one of the at least two second TAs is used to indicate a TA of DU RX and/or MT RX of the IAB node, or indicate a TA of MT TX of the IAB child node, or indicate a TA of TX of the terminal served by the IAB node.

Optionally, the at least two second TAs include a TA based on an independent configuration, a difference configuration, or a ratio configuration.

Optionally, in a case that the first signaling is RRC signaling, MAC CE signaling, or DCI signaling, the RRC signaling, MAC CE signaling, or DCI signaling is used to indicate that the at least two first TAs or the at least two second TAs are the same or different.

Optionally, the first signaling includes first indication information, where the first indication information is used to indicate negative timing advance information supported by the first link state, and the first indication information includes at least one of the following:
- a negative value used to indicate a TA; and
- an indication field used to indicate whether a TA field parameter is positive or negative.

Optionally, the first signaling is radio resource control RRC signaling, medium access control control element MAC CE signaling, downlink control information DCI signaling, physical downlink control channel PDCCH, or backhaul application protocol control protocol data unit BAP control PDU.

Optionally, in a case that the first signaling is RRC signaling or MAC CE signaling, the RRC signaling or MAC CE signaling is used for any one of the following:
- indicating that MT TX follows timing of DU TX;
- indicating a carrier or carrier set of DU TX followed by MT TX;
- indicating a slot or slot set of DU TX followed by MT TX; and
- indicating an orthogonal frequency division multiplexing OFDM symbol or a symbol set of DU TX followed by MT TX.

Optionally, in a case that the first signaling is RRC signaling or MAC CE signaling, the RRC signaling or MAC CE signaling is used for any one of the following:
- indicating that DU RX follows timing of MT RX;
- indicating a carrier or carrier set of MT RX followed by DU RX;
- indicating a slot or slot set of MT RX followed by DU RX; and
- indicating an orthogonal frequency division multiplexing OFDM symbol or a symbol set of MT RX followed by DU RX.

Optionally, in a case that the first signaling is DCI signaling, the DCI signaling carries an indication field or the DCI signaling is scrambled by using a first radio network temporary identifier RNTI, and the DCI signaling is used to:
- in a case that the first link state is a link state in the first transmission mode, indicate that MT TX follows timing of DU TX, or indicate a carrier or carrier set of DU TX followed by MT TX, or a slot or slot set of DU TX followed by MT TX, or an OFDM symbol or symbol set of DU TX followed by MT TX; or
- in a case that the first link state is a link state in the second transmission mode, indicate that MT RX follows timing of DU RX, or indicate a carrier or carrier set of DU RX followed by MT RX, or a slot or slot set of DU RX followed by MT RX, or an OFDM symbol or symbol set of DU RX followed by MT RX.

Optionally, in a case that the first signaling is DCI signaling, the DCI signaling includes a PDCCH order, the PDCCH order is used to indicate a timing pattern of MT TX or indicate a timing pattern of MT RX, and the timing pattern of MT TX or the timing pattern of MT RX is used to:
- in a case that the first link state is a link state in the first transmission mode, indicate that MT TX stops following or follows timing of carrier, slot, slot set, OFDM symbol, or symbol set of DU TX; or
- in a case that the first link state is a link state in the second transmission mode, indicate that MT RX stops following or follows timing of carrier, slot, slot set, OFDM symbol, or symbol set of DU RX.

Figure 11:
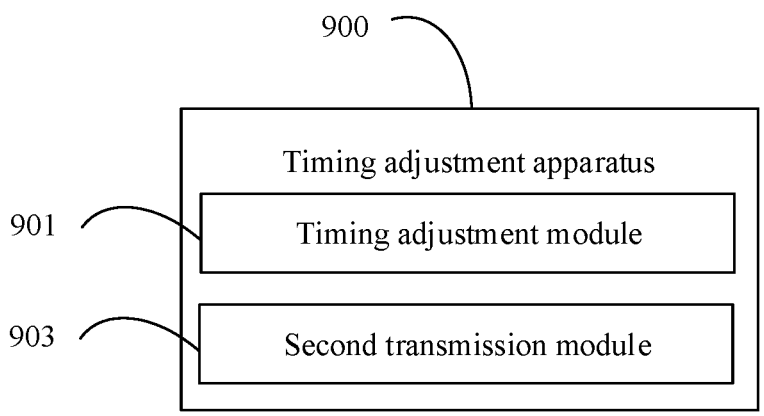
FIG. 11 is a third schematic structural diagram of a timing adjustment apparatus according to an embodiment of the present invention.

Optionally, as shown in FIG. 11, the apparatus 900 further includes:
- a second transmission module 903, configured to transmit response information to the network-side device or the parent node of the first IAB node based on the PDCCH order.

Optionally, in a case that the first signaling is DCI signaling, the DCI signaling is in a first DCI format and is used to:
- in a case that the first link state is a link state in the first transmission mode, indicate that MT TX follows timing of DU TX or uses a timing rule of the first transmission mode; or
- in a case that the first link state is a link state in the second transmission mode, indicate that MT RX follows timing of DU RX or uses a timing rule of the second transmission mode.

It should be noted that any implementation of the first relay device or the terminal in the method embodiment of the present invention can be implemented by the timing adjustment apparatus 900 in this embodiment of the present invention, with the same beneficial effect achieved. To avoid repetition, details are not described herein again.

Optionally, an embodiment of this application further provides a terminal, including a processor 1210, a memory 1209, and a program or instructions stored in the memory 1209 and capable of running on the processor 1210. When the program or instructions are executed by the processor 1210, the processes of the foregoing timing adjustment method embodiment are implemented, with the same technical effect achieved. To avoid repetition, details are not described herein again.

It should be noted that terminals in this embodiment of this application include the foregoing mobile terminal and a nonmobile terminal.

Figure 12:
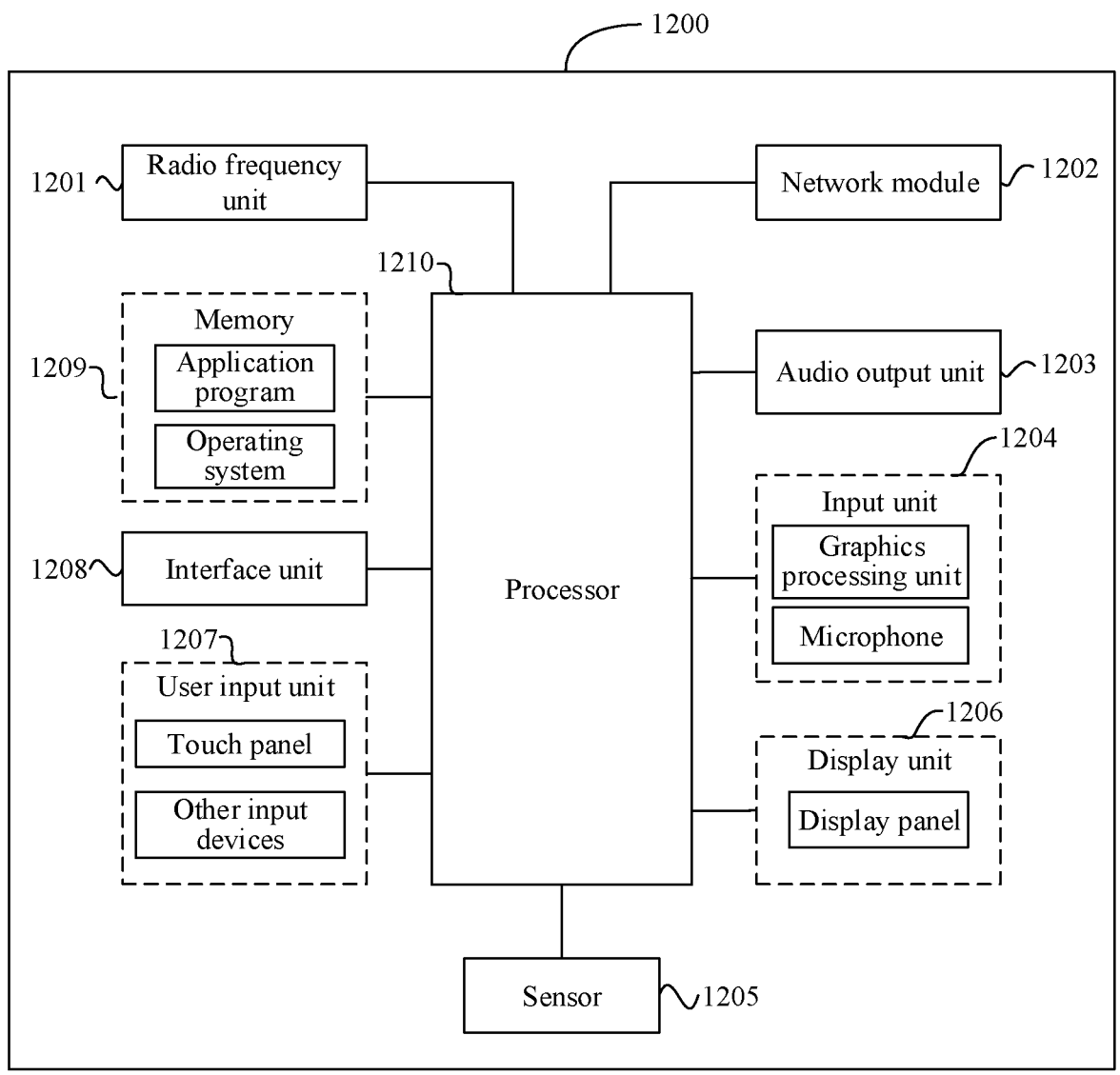
FIG. 12 is a schematic diagram of a hardware structure of a terminal according to an embodiment of this invention.

FIG. 12 is a schematic diagram of a hardware structure of a terminal for implementing an embodiment of this application.

The terminal 1200 includes but is not limited to components such as a radio frequency unit 1201, a network module 1202, an audio output unit 1203, an input unit 1204, a sensor 1205, a display unit 1206, a user input unit 1207, an interface unit 1208, a memory 1209, and a processor 1210.

A person skilled in the art may understand that the terminal 1200 may further include a power supply (for example, a battery) supplying power to the components. The power supply may be logically connected to the processor 1210 via a power management system. In this way, functions such as charge management, discharge management, and power consumption management are implemented via the power management system. The structure of the terminal shown in FIG. 12 does not constitute a limitation on the terminal. The terminal may include more or fewer components than shown in the figure, or combine some of the components, or have different component arrangements. Details are not described herein.

The processor 1210 is configured to:
adjust timing of a first link state based on first signaling, where
the first link state is a link state of a first relay device or the terminal; and
the first signaling is provided by a parent node of the first relay device, or a parent node of the terminal, or a first network-side device, where the parent node is a last-hop device of the first relay device or the terminal.

Optionally, the first relay device is a first integrated access backhaul IAB node.

Optionally, the first link state is a link state in a first transmission mode, where
the first transmission mode is that mobile terminal transmission MT TX and distributed unit transmission DU TX of the IAB node are aligned on time domain unit or work simultaneously.

Optionally, the first link state includes at least one of the following:
MT TX and/or DU TX of the first IAB node; and
TX of the terminal, where the terminal is served by the parent node of the first IAB node.

Optionally, the first signaling includes at least one of the following:
an offset $T_{additional}$ of a timing advance TA, where the TA is obtained based on $N_{TA}$ and $N_{TA,offset}$;
the $N_{TA}$ and the $N_{TA,offset}$; and
$T_{delta}$, where the $T_{delta}$ is used to adjust timing of DU TX of the first IAB node.

Optionally, the first signaling includes at least two first TAs, and at least one of the at least two first TAs is used to indicate a TA at a DU TX and/or MT TX occasion of the first IAB node.

Optionally, the at least two first TAs include at least one of the following:
a TA based on an independent configuration, a difference configuration, or a ratio configuration.

Optionally, the first signaling is used to indicate an effective time of the at least two first TAs.

Optionally, the first signaling is further used to indicate that MT TX and DU TX of the first IAB node are synchronized or aligned on time domain unit.

Optionally, the radio frequency unit 1201 is configured to:
transmit second signaling to the last-hop device, where the second signaling is used by the last-hop device to configure timing.

Optionally, the second signaling satisfies at least one of the following:
being used to indicate whether a DU and an MT of the first IAB node share a radio frequency RF;
being used to indicate whether the first IAB node supports synchronization or alignment on time domain unit;
being used to indicate a simultaneous transmission occasion of MT TX and DU TX expected by the first IAB node or that the first IAB node expects alignment of MT TX and DU TX on time domain unit; and
being used to indicate a transmission pattern of MT TX and/or DU TX expected by the first IAB node.

Optionally, the first link state is a link state in a second transmission mode, where
the second transmission mode is that mobile terminal reception MT RX and distributed unit reception DU RX of the first IAB node are aligned on time domain unit or work simultaneously.

Optionally, the first link state includes at least one of the following:
MT RX and/or DU RX of the first IAB node;
MT TX of the first IAB node, where the parent node of the first IAB node is a second IAB node, and the first signaling is signaling provided by the second IAB node to the first IAB node; and
TX of the terminal, where the terminal is served by the first IAB node.

Optionally, the first signaling includes at least one of the following:
an advance beta of DU TX with respect to DU RX; and
an offset gamma of a TA.

Optionally, the first signaling includes at least two second TAs, and at least one of the at least two second TAs is used to indicate a TA of DU RX and/or MT RX of the IAB node, or indicate a TA of MT TX of the IAB child node, or indicate a TA of TX of the terminal served by the IAB node.

Optionally, the at least two second TAs include a TA based on an independent configuration, a difference configuration, or a ratio configuration.

Optionally, in a case that the first signaling is RRC signaling, MAC CE signaling, or DCI signaling, the RRC signaling, MAC CE signaling, or DCI signaling is used to indicate that the at least two first TAs or the at least two second TAs are the same or different.

Optionally, the first signaling includes first indication information, where the first indication information is used to indicate negative timing advance information supported by the first link state, and the first indication information includes at least one of the following:
a negative value used to indicate a TA; and
an indication field used to indicate whether a TA field parameter is positive or negative.

Optionally, the first signaling is radio resource control RRC signaling, medium access control control element MAC CE signaling, downlink control information DCI signaling, physical downlink control channel PDCCH, or backhaul application protocol control protocol data unit BAP control PDU.

Optionally, in a case that the first signaling is RRC signaling or MAC CE signaling, the RRC signaling or MAC CE signaling is used for any one of the following:
indicating that MT TX follows timing of DU TX;
indicating a carrier or carrier set of DU TX followed by MT TX;
indicating a slot or slot set of DU TX followed by MT TX; and
indicating an orthogonal frequency division multiplexing OFDM symbol or a symbol set of DU TX followed by MT TX.

Optionally, in a case that the first signaling is RRC signaling or MAC CE signaling, the RRC signaling or MAC CE signaling is used for any one of the following:
indicating that DU RX follows timing of MT RX;
indicating a carrier or carrier set of MT RX followed by DU RX;
indicating a slot or slot set of MT RX followed by DU RX; and
indicating an orthogonal frequency division multiplexing OFDM symbol or a symbol set of MT RX followed by DU RX.

Optionally, in a case that the first signaling is DCI signaling, the DCI signaling carries an indication field or the DCI signaling is scrambled by using a first radio network temporary identifier RNTI, and the DCI signaling is used to:
in a case that the first link state is a link state in the first transmission mode, indicate that MT TX follows timing of DU TX, or indicate a carrier or carrier set of DU TX followed by MT TX, or a slot or slot set of DU TX followed by MT TX, or an OFDM symbol or symbol set of DU TX followed by MT TX; or
in a case that the first link state is a link state in the second transmission mode, indicate that MT RX follows timing of DU RX, or indicate a carrier or carrier set of DU RX followed by MT RX, or a slot or slot set of DU RX followed by MT RX, or an OFDM symbol or symbol set of DU RX followed by MT RX.

Optionally, in a case that the first signaling is DCI signaling, the DCI signaling includes a PDCCH order, the PDCCH order is used to indicate a timing pattern of MT TX or indicate a timing pattern of MT RX, and the timing pattern of MT TX or the timing pattern of MT RX is used to:

in a case that the first link state is a link state in the first transmission mode, indicate that MT TX stops following or follows timing of carrier, slot, slot set, OFDM symbol, or symbol set of DU TX; or in a case that the first link state is a link state in the second transmission mode, indicate that MT RX stops following or follows timing of carrier, slot, slot set, OFDM symbol, or symbol set of DU RX.

Optionally, the radio frequency unit 1201 is further configured to:

transmit response information to the network-side device or the parent node of the first IAB node based on the PDCCH order.

Optionally, in a case that the first signaling is DCI signaling, the DCI signaling is in a first DCI format and is used to:

in a case that the first link state is a link state in the first transmission mode, indicate that MT TX follows timing of DU TX or uses a timing rule of the first transmission mode; or in a case that the first link state is a link state in the second transmission mode, indicate that MT RX follows timing of DU RX or uses a timing rule of the second transmission mode.

Figure 13:
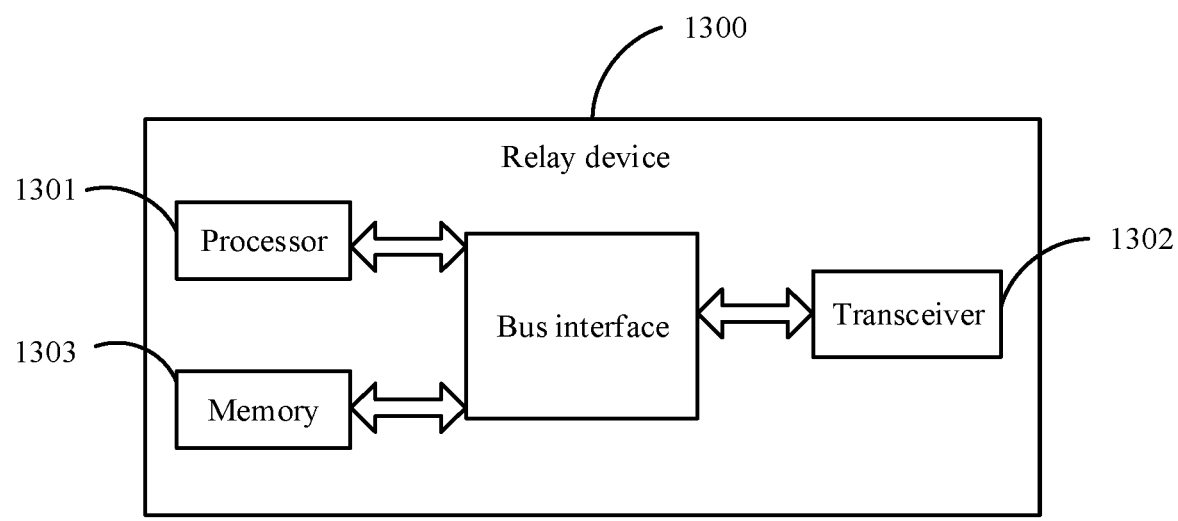
FIG. 13 is a schematic diagram of a hardware structure of a relay device according to an embodiment of this invention.

FIG. 13 is a structural diagram of a relay device according to an embodiment of the present invention. The relay device may be the first relay device in the foregoing method embodiment. As shown in FIG. 13, the relay device 1300 includes a processor 1301, a transceiver 1302, a memory 1303, and a bus interface.

The processor 1301 is configured to:

adjust timing of a first link state based on first signaling, where the first link state is a link state of the first relay device or a terminal; and the first signaling is provided by a parent node of the first relay device, or a parent node of the terminal, or a first network-side device, where the parent node is a last-hop device of the first relay device or the terminal.

Optionally, the first relay device is a first integrated access backhaul IAB node.

Optionally, the first link state is a link state in a first transmission mode, where the first transmission mode is that mobile terminal transmission MT TX and distributed unit transmission DU TX of the IAB node are aligned on time domain unit or work simultaneously.

Optionally, the first link state includes at least one of the following:

MT TX and/or DU TX of the first IAB node; and

TX of the terminal, where the terminal is served by the parent node of the first IAB node.

Optionally, the first signaling includes at least one of the following:

an offset $T_{additional}$ of a timing advance TA, where the TA is obtained based on $N_{TA}$ and $N_{TA,offset}$;

the $N_{TA}$ and the $N_{TA,offset}$; and $T_{delta}$, where the $T_{delta}$ is used to adjust timing of DU TX of the first IAB node.

Optionally, the first signaling includes at least two first TAs, and at least one of the at least two first TAs is used to indicate a TA at a DU TX and/or MT TX occasion of the first IAB node.

Optionally, the at least two first TAs include at least one of the following:

a TA based on an independent configuration, a difference configuration, or a ratio configuration.

Optionally, the first signaling is used to indicate an effective time of the at least two first TAs.

Optionally, the first signaling is further used to indicate that MT TX and DU TX of the first IAB node are synchronized or aligned on time domain unit.

Optionally, the transceiver 1302 is configured to:

transmit second signaling to the last-hop device, where the second signaling is used by the last-hop device to configure timing.

Optionally, the second signaling satisfies at least one of the following:

being used to indicate whether DU and MT of the first IAB node share a radio frequency RF;

being used to indicate whether the first IAB node supports synchronization or alignment on time domain unit;

being used to indicate a simultaneous transmission occasion of MT TX and DU TX expected by the first IAB node or that the first IAB node expects alignment of MT TX and DU TX on time domain unit; and being used to indicate a transmission pattern of MT TX and/or DU TX expected by the first IAB node.

Optionally, the first link state is a link state in a second transmission mode, where the second transmission mode is that mobile terminal reception MT RX and distributed unit reception DU RX of the first IAB node are aligned on time domain unit or work simultaneously.

Optionally, the first link state includes at least one of the following:

MT RX and/or DU RX of the first IAB node;

MT TX of the first IAB node, where the parent node of the first IAB node is a second IAB node, and the first signaling is signaling provided by the second IAB node to the first IAB node; and TX of the terminal, where the terminal is served by the first IAB node.

Optionally, the first signaling includes at least one of the following:

an advance beta of DU TX with respect to DU RX; and an offset gamma of a TA.

Optionally, the first signaling includes at least two second TAs, and at least one of the at least two second TAs is used to indicate a TA of DU RX and/or MT RX of the IAB node, or indicate a TA of MT TX of the IAB child node, or indicate a TA of TX of the terminal served by the IAB node.

Optionally, the at least two second TAs include a TA based on an independent configuration, a difference configuration, or a ratio configuration.

Optionally, in a case that the first signaling is RRC signaling, MAC CE signaling, or DCI signaling, the RRC signaling, MAC CE signaling, or DCI signaling is used to indicate that the at least two first TAs or the at least two second TAs are the same or different.

Optionally, the first signaling includes first indication information, where the first indication information is used to indicate negative timing advance information supported by the first link state, and the first indication information includes at least one of the following:

a negative value used to indicate a TA; and an indication field used to indicate whether a TA field parameter is positive or negative.

Optionally, the first signaling is radio resource control RRC signaling, medium access control control element MAC CE signaling, downlink control information DCI signaling, physical downlink control channel PDCCH, or backhaul application protocol control protocol data unit BAP control PDU.

Optionally, in a case that the first signaling is RRC signaling or MAC CE signaling, the RRC signaling or MAC CE signaling is used for any one of the following:
- indicating that MT TX follows timing of DU TX;
- indicating a carrier or carrier set of DU TX followed by MT TX;
- indicating a slot or slot set of DU TX followed by MT TX; and
- indicating an orthogonal frequency division multiplexing OFDM symbol or a symbol set of DU TX followed by MT TX.

Optionally, in a case that the first signaling is RRC signaling or MAC CE signaling, the RRC signaling or MAC CE signaling is used for any one of the following:
- indicating that DU RX follows timing of MT RX;
- indicating a carrier or carrier set of MT RX followed by DU RX;
- indicating a slot or slot set of MT RX followed by DU RX; and
- indicating an orthogonal frequency division multiplexing OFDM symbol or a symbol set of MT RX followed by DU RX.

Optionally, in a case that the first signaling is DCI signaling, the DCI signaling carries an indication field or the DCI signaling is scrambled by using a first radio network temporary identifier RNTI, and the DCI signaling is used to:
- in a case that the first link state is a link state in the first transmission mode, indicate that MT TX follows timing of DU TX, or indicate a carrier or carrier set of DU TX followed by MT TX, or a slot or slot set of DU TX followed by MT TX, or an OFDM symbol or symbol set of DU TX followed by MT TX; or
- in a case that the first link state is a link state in the second transmission mode, indicate that MT RX follows timing of DU RX, or indicate a carrier or carrier set of DU RX followed by MT RX, or a slot or slot set of DU RX followed by MT RX, or an OFDM symbol or symbol set of DU RX followed by MT RX.

Optionally, in a case that the first signaling is DCI signaling, the DCI signaling includes a PDCCH order, the PDCCH order is used to indicate a timing pattern of MT TX or indicate a timing pattern of MT RX, and the timing pattern of MT TX or the timing pattern of MT RX is used to:
- in a case that the first link state is a link state in the first transmission mode, indicate that MT TX stops following or follows timing of carrier, slot, slot set, OFDM symbol, or symbol set of DU TX; or
- in a case that the first link state is a link state in the second transmission mode, indicate that MT RX stops following or follows timing of carrier, slot, slot set, OFDM symbol, or symbol set of DU RX.

Optionally, the transceiver 1302 is further configured to: transmit response information to the network-side device or the parent node of the first IAB node based on the PDCCH order.

Optionally, in a case that the first signaling is DCI signaling, the DCI signaling is in a first DCI format and is used to:
- in a case that the first link state is a link state in the first transmission mode, indicate that MT TX follows timing of DU TX or uses a timing rule of the first transmission mode; or
- in a case that the first link state is a link state in the second transmission mode, indicate that MT RX follows timing of DU RX or uses a timing rule of the second transmission mode.

In FIG. 13, a bus architecture may include any quantity of interconnected buses and bridges, and specifically connects together circuits that are of one or more processors represented by the processor 1301 and of a memory represented by the memory 1303. The bus architecture may further interconnect various other circuits such as a peripheral device, a voltage regulator, and a power management circuit. These are all well known in the art, and therefore are not further described in this specification. The bus interface provides an interface. The transceiver 1302 may be a plurality of components, including a transmitter and a receiver, and provides units for communicating with a variety of other apparatuses on a transmission medium.

The processor 1301 is responsible for management of the bus architecture and general processing, and the memory 1303 is capable of storing data that is used by the processor 1301 during an operation.

It should be noted that the relay device 1300 in this embodiment may be the first relay device in any implementation of the method embodiment in the embodiments of the present invention, and any implementation of the first relay device in the method embodiment in the embodiments of the present invention can be implemented by the relay device 1300 in this embodiment, with the same beneficial effect achieved. Details are not described herein again.

An embodiment of the present invention further provides a computer-readable storage medium. The computer-readable storage medium stores a computer program. When the computer program is executed by a processor, the processes of the foregoing embodiment corresponding to the timing adjustment method are implemented, with the same technical effect achieved. To avoid repetition, details are not described herein again. The computer-readable storage medium is, for example, a read-only memory (ROM), a random access memory (RAM), a magnetic disk, or an optical disc.

In addition, an embodiment of this application provides a chip. The chip includes a processor and a communications interface. The communications interface is coupled to the processor. The processor is configured to run a program or instructions to implement the processes of the foregoing timing adjustment method embodiment, with the same technical effect achieved. To avoid repetition, details are not described herein again.

It should be understood that the chip provided in this embodiment of this application may also be referred to as a system-level chip, a system chip, a chip system, a system-on-chip, or the like.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiments are merely examples. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communications connections through some interfaces, apparatuses or units, and may be implemented in electrical, mechanical, or other forms.

The units described as separate parts may or may not be physically separate and parts displayed as units may or may not be physical units, meaning that they may be located in one position or distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of the present invention.

A person of ordinary skill in the art may understand that all or some of the processes of the methods in the embodiments may be implemented by a computer program controlling relevant hardware. The program may be stored in a computer-readable storage medium. When the program runs, the processes of the methods in the embodiments are performed. The storage medium may be: a magnetic disk, an optical disc, a read-only memory (ROM), a random access memory (RAM), or the like.

It may be understood that the embodiments described in the embodiments of the present disclosure may be implemented by hardware, software, firmware, middleware, microcode, or a combination thereof. For hardware implementation, the module, unit, or subunit may be implemented in one or more application specific integrated circuits (ASIC), digital signal processors (DSP), digital signal processing devices (DSP Device, DSPD), programmable logic devices (PLD), field-programmable gate arrays (FPGA), general purpose processors, controllers, microcontrollers, microprocessors, and other electronic units for performing the functions described in the present disclosure, or a combination thereof.

For software implementation, the techniques described in the embodiments of this disclosure may be implemented by modules (such as processes and functions) that perform the functions described in the embodiments of this disclosure. Software code may be stored in the memory and executed by the processor. The memory may be implemented in or outside the processor.

The foregoing descriptions are only specific implementations of the present invention and are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A timing adjustment method, performed by a first relay device and comprising:
   adjusting timing of a first link state based on first signaling, wherein
   the first link state is a link state of the first relay device or the terminal; and
   the first signaling is provided by a parent node of the first relay device, wherein the parent node is a last-hop device of the first relay device;
   wherein the first relay device is a first integrated access backhaul IAB node;
   wherein the first link state is a link state in a first transmission mode, wherein the first transmission mode is that mobile terminal transmission (MT TX) and distributed unit transmission (DU TX) of the IAB node are aligned on time domain unit or work simultaneously;
   wherein in a case that the first signaling is medium access control control element (MAC CE) signaling, the MAC CE signaling is used for indicating that MT TX follows timing of DU TX.

2. The method according to claim 1, wherein the first link state comprises at least one of the following:
   MT TX and/or DU TX of the first IAB node.

3. The method according to claim 1, wherein the first signaling comprises at least one of the following:
   an offset Tadditional of a timing advance (TA), wherein the TA is obtained based on NTA and NTA, offset;
   the NTA and the NTA, offset; and
   Tdelta, wherein the Tdelta is used to adjust timing of DU TX of the first IAB node.

4. The method according to claim 1, wherein the first signaling comprises at least two first TAs, and at least one of the at least two first TAs is used to indicate a TA at a DU TX and/or MT TX occasion of the first IAB node.

5. The method according to claim 1, wherein the first signaling comprises at least one of the following:
   an advance beta of DU TX with respect to DU RX; and
   an offset gamma of a TA.

6. The method according to claim 1, wherein the first signaling comprises first indication information, wherein the first indication information is used to indicate negative timing advance information supported by the first link state, and the first indication information comprises at least one of the following:
   a negative value used to indicate a TA; and
   an indication field used to indicate whether a TA field parameter is positive or negative.

7. A first relay device, comprising a memory, a processor, and a computer program stored in the memory and capable of running on the processor, wherein the processor executes the computer program to perform:
   adjusting timing of a first link state based on first signaling, wherein the first link state is a link state of the first relay device; and the first signaling is provided by a parent node of the first relay device, wherein the parent node is a last-hop device of the first relay device;

wherein the first relay device is a first integrated access backhaul IAB node;

wherein the first link state is a link state in a first transmission mode, wherein the first transmission mode is that mobile terminal transmission (MT TX) and distributed unit transmission (DU TX) of the IAB node are aligned on time domain unit or work simultaneously;

wherein in a case that the first signaling is medium access control control element (MAC CE) signaling, the MAC CE signaling is used for indicating that MT TX follows timing of DU TX.

8. The first relay device according to claim 7, wherein the first link state comprises at least one of the following:
MT TX and/or DU TX of the first IAB node.

9. The first relay device according to claim 7, wherein the first signaling comprises at least one of the following:
an offset Tadditional of a timing advance (TA), wherein the TA is obtained based on NTA and NTA, offset;
the NTA and the NTA, offset; and
Tdelta, wherein the Tdelta is used to adjust timing of DU TX of the first IAB node.

10. The first relay device according to claim 7, wherein the first signaling comprises at least two first TAs, and at least one of the at least two first TAs is used to indicate a TA at a DU TX and/or MT TX occasion of the first IAB node.

11. The first relay device according to claim 7, wherein the first signaling comprises at least one of the following:
an advance beta of DU TX with respect to DU RX; and
an offset gamma of a TA.

12. The first relay device according to claim 7, wherein the first signaling comprises first indication information, wherein the first indication information is used to indicate negative timing advance information supported by the first link state, and the first indication information comprises at least one of the following:
a negative value used to indicate a TA; and
an indication field used to indicate whether a TA field parameter is positive or negative.

13. A non-transitory computer-readable storage medium, wherein the computer-readable storage medium stores a computer program, and the computer program, when executed by a processor, causes the processor to perform the following steps:
adjusting timing of a first link state based on first signaling, wherein the first link state is a link state of the first relay device; and the first signaling is provided by a parent node of the first relay device, wherein the parent node is a last-hop device of the first relay device;

wherein the first relay device is a first integrated access backhaul IAB node;

wherein the first link state is a link state in a first transmission mode, wherein the first transmission mode is that mobile terminal transmission (MT TX) and distributed unit transmission (DU TX) of the IAB node are aligned on time domain unit or work simultaneously;

wherein in a case that the first signaling is medium access control control element (MAC CE) signaling, the MAC CE signaling is used for indicating that MT TX follows timing of DU TX.

14. The non-transitory computer-readable storage medium to claim 13, wherein the first link state comprises at least one of the following:
MT TX and/or DU TX of the first IAB node.

15. The non-transitory computer-readable storage medium to claim 13, wherein the first signaling comprises at least one of the following:
an offset T additional of a timing advance (TA), wherein the TA is obtained based on NTA and NTA, offset;
the NTA and the NTA, offset; and
Tdelta, wherein the Tdelta is used to adjust timing of DU TX of the first IAB node.

16. The non-transitory computer-readable storage medium to claim 13, wherein the first signaling comprises at least two first TAs, and at least one of the at least two first TAs is used to indicate a TA at a DU TX and/or MT TX occasion of the first IAB node.

17. The non-transitory computer-readable storage medium to claim 13, wherein the first signaling comprises at least one of the following:
an advance beta of DU TX with respect to DU RX; and
an offset gamma of a TA.

18. The non-transitory computer-readable storage medium to claim 13, wherein the first signaling comprises first indication information, wherein the first indication information is used to indicate negative timing advance information supported by the first link state, and the first indication information comprises at least one of the following:
a negative value used to indicate a TA; and
an indication field used to indicate whether a TA field parameter is positive or negative.

* * * * *